United States Patent [19]

Oestreich et al.

[11] Patent Number: 4,746,190
[45] Date of Patent: May 24, 1988

[54] OPTICAL CABLE HAVING A PLURALITY OF MAIN BUNDLES

[75] Inventors: Ulrich Oestreich; Gernot Schöber, both of Munich, Fed. Rep. of Germany

[73] Assignee: Siemens Aktiengesellschaft, Berlin & Munich, Fed. Rep. of Germany

[21] Appl. No.: 921,191

[22] Filed: Oct. 21, 1986

[30] Foreign Application Priority Data

Oct. 22, 1985 [DE] Fed. Rep. of Germany ....... 3537553

[51] Int. Cl.⁴ ............................................. G02B 96/23
[52] U.S. Cl. .............................. 350/96.23; 350/96.24
[58] Field of Search ...................................... 350/96.23

[56] References Cited

U.S. PATENT DOCUMENTS 4,154,049 5/1979 King et al. ................... 350/96.23 X
4,468,088 8/1984 van der Hoek ................. 350/96.23

Primary Examiner—Paul Gensler
Attorney, Agent, or Firm—Hill, Van Santen, Steadman & Simpson

[57] ABSTRACT

An optical cable formed by a plurality of main bundles with each of the main bundles being composed of a plurality of sub-bundles having at least one optical lead. The sub-bundles are preferably stranded around a central element and the main bundles are stranded around a central core or element with the direction of stranding of both the sub-bundles and main bundles being reversed with a spacing between the locations of the reversing of the stranded main bundles and of the stranded sub-bundle being approximately equal. Preferably, the spacing between the reversing locations is smaller than the standard length of a standard cable sleeve so that a cable sleeve applied to the cable will always have at least one reversing location for the stranded main bundles and sub-bundles within the cable sleeve.

22 Claims, 2 Drawing Sheets

4,746,190

OPTICAL CABLE HAVING A PLURALITY OF MAIN BUNDLES

BACKGROUND OF THE INVENTION

The invention is directed to an optical cable comprising a plurality of main bundles with each of the main bundles being a bundle of a plurality of leads or sub-bundles containing at least one lead or optical waveguide.

German OS No. 31 44 205 discloses an optical cable wherein individual main bundles are arranged next to one another and are connected to one another by a partable web. This offers the possibility of creating a simple branching in the frame work of a distribution network because the respective connecting web is parted or cut and one or more of the main bundles are then branched off from the continuing main line into different directions. However, when the complete cable bundle is to be drawn into an existing pipe or cable run, difficulties will occur given such a cable structure because the overall arrangement is not surrounded by its own jacket or is not provided with a wrapping and does not have a round cross sectional shape. Thus, there are chances of snagging the cable as it is pulled through cable ducts, pipes or runs.

SUMMARY OF THE INVENTION

The object of the present invention is to improve an optical catle having a plurality of main bundles with each of the main bundles consisting of a bundle of a plurality of leads in that the structure of the cable is mechanically more favorable and more advantageous for drawing the cable into runs and ducts. In addition, the structure of the cable enables branching from the optical cable to be continued to be formed without requiring the use of outlet sleeves with splice inserts.

These objects are achieved by the present invention by an improvement in an optical cable comprising a cable core of a plurality of main bundles, each of the main bundles being constructed by a plurality of sub-bundles, each containing at least one optical lead or waveguide. The improvements comprise the main bundles of the core being stranded with changing direction of lay and spaced reversal points, the sub-bundles of each main bundle being stranded with changing direction of lay with reversible locations, the spacing between the reversing points of the main bundles and the reversing locations of the sub-bundles being roughly the same, and the spacing of the reversing points of the main bundles in comparison of those for the sub-bundles being selected to be smaller than or equal to the usual length of a cable sleeve so that when placing a cable sleeve on the optical cable, at least one reversing location and one reversing point will be positioned within the sleeve.

Since the main bundles are stranded with the changing direction of lay, every main bundle can be released without further ado from the cable core union at a corresponding branching location because the SZ-stranding can, in turn, be undone as seen over a longer path without leaving a permanent torsion or twist behind. Thus, at the branching location, it is adequate to part an outside cladding that may be present or to part a cohesion of the optical cable and to make the respective main bundles accessible. Since the sub-bundles are also SZ-stranded, their union can also be undone in a simple way. In that the reversing locations or points for the main bundles and the reversing locations for the sub-bundles are practically coincident or at a distance of less than one sleeve length from one another, a respective reversing location is alway available within a cable sleeve for both stranded main bundles and subbundles and this will considerably facilitate the accessibility and the branching operation.

It is expedient to reduce the number of lays for the main bundles between two reversing locations from the usual 7-8 lays down to 1-2 lays.

In accordance with an advantageous modification of the invention, each of the main bundles represents an independent cable because it is individually cladded.

It is expedient to select the spacing of the reversal locations of the SZ-stranding for the main bundles and for the sub-bundles as small as possible, namely advantageously not greater than given values in a range of 0.2 to 0.5 m. This offers the possibility that the branching sleeve can be placed at the desired location. In addition, it can be advantageous to identify the reversing location of the sub-bundles on the outside of the respective jacket or cladding of the main bundles, for example, by markings or the like being applied to the jacket of the bundles. Cuts for splices can thereby be placed at particularly favorable locations relative to the reversing locations or points.

DESCRIPTION OF THE PREFERRED EMBODIMENTS

Figure 1:
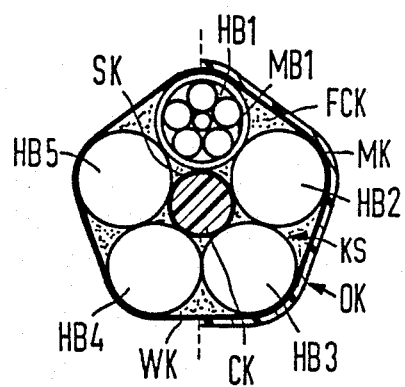
FIG. 1 is a cross sectional view with portions removed of an optical cable in accordance with the present invention.

The principles of the present invention are particularly useful in an optical cable generally indicated at OK in FIG. 1 and containing a cable core KS having a central core or element CK of tensile material, for example, steel wires or either tensile plastic fibers or glass fibers. A layer of main bundles HB1–HB5 are stranded around the central core CK with a changing direction of lay to provide an SZ-stranding. The cable core KS formed in this way is held together by means of at least one retaining helix WK applied at the stranding points so that a firm union will occur. In accordance with the first embodiment, the cable core KS may be surrounded by a cable jacket MK which is preferably fashioned to have a thickness of between 1.5 and 2.5 mm.

Figure 5:
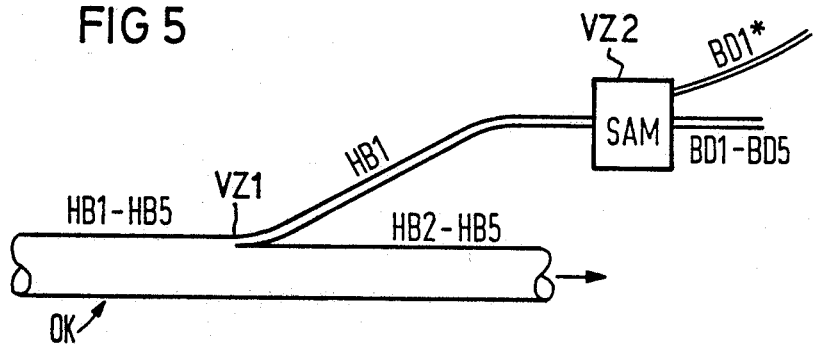
FIG. 5 is a schematic presentation of the details of a network structure utilizing the cable of the present invention.

It can be frequently more expedient to secure the cohesion of the cable core KS not by a jacket MK but only by the retaining helix WK and preferably two helixes are applied in counter-lay. In this case, when no jacket MK is present outside of the retaining helix WK, the inside of the helix WK is expediently provided with a hot melt adhesive and is fixed on the cable core KS by means of a brief influence of heat, for example, by means of hot pressure wheels or by means of hot air. As a result thereof, the undoing of the retaining helix union is prevented even when a retaining helix WK becomes frayed during the drawing of the cable through a cable duct or carrier. Since the main bundles are provided with separate jackets, for example, see the main bundle HB1 having a jacket MB1, the main bundle can be branched off from the overall union as an independent sub-cable and can be laid in a further direction, such as illustrated in FIG. 5.

The cohesion of the cable core KS can also be improved when the surface of the central core CK is provided with a layer SK of a hot melt adhesive. The jacket of the main bundles, such as the jacket MB1 for the main bundle HB1, are fixed to this hot melt adhesive layer and thus, form a correspondingly firm core union. The lay of the SZ-stranded main bundles HB1–HB5 is selected of such a length in the cable core KS that there still remains adequate flexibility. The flexibility of the cable should not be deteriorated due to the gluing or adhesion of the main bundles to the central core CK. In this context, it is expedient when a relaxing hot-melt adhesive is utilized. The central core CK is expediently coated with a hot-melt adhesive immediately before the application of the cladded main bundles HB1–HB5 so that a firm union within the cable core occurs with the assistance of a retaining helix WK subsequently applied at the stranding points. Both the jacket MK (when present) as well as the individual jackets of the main bundles HB1–HB5 are expediently treated with a lubricating wax in order to keep the required forces for drawing the cable or main bundles into a run low. When the individual cladded main bundles HB1–HB5 are held together only with the retaining helix WK, the union can readily be parted upon draw in and one or more of the main bundles HB1HB5 can be released from the union by longitudinally parting of the retaining helix WK and under some conditions, heating the hot-melt adhesive SK. As a consequence of the SZ-stranding of the main bundles HB1–HB5, no difficulties will occur because no continuous wrapping of the central core CK occurs in the SZ-stranding which continuous wrapping would be incapable of being undone without further ado but rather only a corresponding seating with alternate stranding directions of the main bundles HB1–HB5 is present. It is expedient in this context to select the number of lays and the length of the lays as low as possible. Per stranding direction, the main bundles HB1–HB5 expediently comprise only between 1 and 2 stranding lays. This involves a type of meandering covering.

Figure 2:
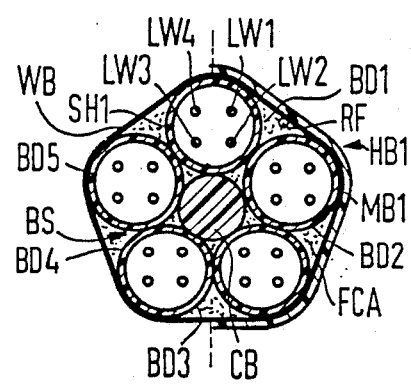
FIG. 2 is a cross sectional view in enlarged scale with portions removed of a main bundle of the cable core of FIG. 1.

It may be seen from the enlarged cross section of the main bundle HB1 in FIG. 2, that the central element CB is also provided and it is likewise constructed of steel or a resin saturated fibers. A plurality of sub-bundles BD1–BD5 are stranded onto the central element CB with a changing direction of lay and are held together at the outside by at least one retaining helix WB. The bundle core BS of the main bundle HB1 formed in this way may be surrounded by an outer jacket MB1 for the case of the branching without a cable sleeve. The jacket MB1 first, is selected of such a thickness that a laying or, respectively, drawing in into separate cable trenches or cable ducts remains possible for the main bundles HB1–HB5 when they are branched from the overall union but secondly, such that the overall structure of the optical cable OK of FIG. 1 nonetheless does not receive an unnecessary large value for its diameter value. In order to keep the overall dimensions of the main bundles HB1–HB5 as small as possible, the jacket MB1 of every main bundle should comprise a wall thickness of between 0.2 and 1 mm. The jacket material itself should exhibit low abrasion and good guide or slide properties. In this context, thus, material such as linear low density polyethylene (LLDPE), high density polyethylene (HDPE), polypropylene (PP) and polyamides (PA) are particularly suited. These materials, moreover, are all resistant to an attack by the filling compounds, such as the filling compounds FCK of FIG. 1 and FCA of FIG. 2, which are all too aggressive and are provided when a longitudinal water tightness of the cable OK and/or of the main bundles HB1–HB5 are desired respectively.

In order to facilitate the work of the splicing operation, a tear-out thread RF is arranged in each of the main bundles HB1–HB5. This tear-out thread RF makes it possible to part or cut a portion or length of the cable jacket MB in a longitudinal direction. Each of the sub-bundles or bundles leads BD1–BD5, respectively, comprises a flexible outside protective sheath, such as SH1, for the sub-bundle BD1 which is a tubular construction and whose inside contains at least one waveguide. As illustrated in FIG. 2, four waveguides LW1–LW4 are disposed in each of the sheaths forming the sub-bundle or bundles leads BD1–BD5. In addition, a filling compound which is not illustrated can also be inserted in each of these sheaths.

Figure 3:
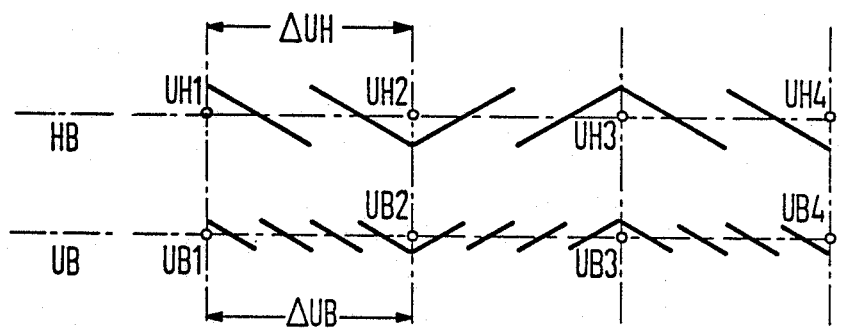
FIG. 3 is a schematic presentation of the stranding patterns for the optical cable in accordance with the present invention.

In FIG. 3, a schematic illustration of the stranding of the main bundles HB1–HB5 to the core KS is illustrated in an upper line HB. The number of lays is indicated by correspondingly oblique strokes and the reversing locations or points are referenced UH1, UH2, UH3 and UH4. It is assumed in the present example that the individual main bundles HB1–HB5 of FIG. 1 are respectively stranded with two lays in one direction and these two lays are followed by a reversing location or point and then by another two lays in the other direction, etc. The spacing between the reversing locations of the main bundles is referenced $\Delta UH$.

The stranding of the bundle leads or sub-bundles BD1–BD5 of FIG. 2 to form a main bundles occurs in the same allocation of the respective reversing locations. The reversing locations of the sub-bundles are respectively referenced UB1–UB4 on line UB (FIG. 3) and it is assumed that four respective stranding lays lie between successive reversing locations and because of the thinner nature of the sub-bundles BD1 to BD5, each subbundle will have a shorter length for each lay. The spacing between successive reversing locations or points for the sub-bundles is referenced $\Delta UB$, wherein $\Delta UH$ equals $\Delta UB$. The allocation of the reversing locations UH1–UH4 of the main bundles HB and of the reversing locations UB1–UB4 of the sub-bundles BD1–BD5 is selected so that in the present example, they coincide. However, it is also possible to provide a constant offset between the reversing locations UH1–UH4 of the main bundles on the one hand, and the corresponding reversing locations UB1–UB4 of the bundle leads on the other hand to provide a type of "phase shift". When, for example, $\Delta UH$ equals $\Delta UB$ equals 320 mm, then the length of the lay for the main bundles HB1–HB5 in the example of FIG. 3 is selected to be 160 mm and is to be selected as 80 mm for the each of the bundle leads or sub-bundles BD1–BD5.

In general, the following distribution can be considered expedient:

Spacing ΔUH of the reversing locations of the main bundles HB1–HB5 and the spacing ΔUB of the sub-bundles BD1–BD5 is in a range of 0.2–0.5 m;

The number of standing lays in one direction for the main bundles is in a range of 1 through 3 lays;

The number of stranding lays in one direction for the sub-bundles BD1–BD5 is in a range of 3 through 8 lays.

Figure 4:
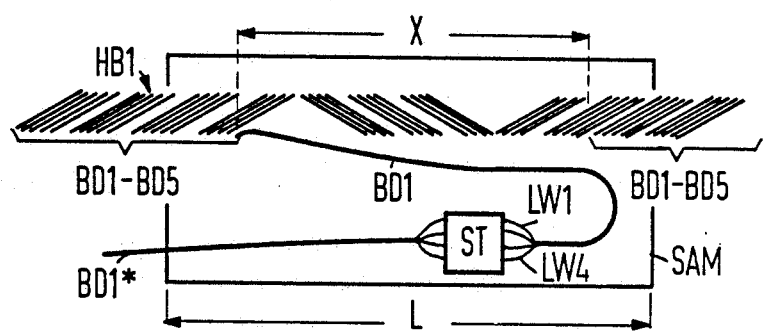
FIG. 4 is a schematic view of a splicing region of the bundle.

When the spacing between the reversing locations UH1 and UB1 of the main bundles and of the sub-bundles are kept lengthwise to a value which lies below the length of the standard branching or cable sleeve which usually has a length of between 0.3 and 0.7 meters, then it is guaranteed that in accordance with the illustration of FIG. 4, at least one reversing location for both the main bundles HB1–HB5 as well as the sub-bundles BD1–BD5 will lie within the branching sleeve SAM which is schematically illustrated in FIG. 4. To express it in other terms, this means that the value ΔUH equals ΔUB and must always be selected smaller than the smallest sleeve length L to be empoyed in the respective laying area. When it is assumed that the spacing between the reversing locations for the main bundlel HB1–HB5 and of the sub-bundles BD1–BD5, i.e. ΔUH and ΔUB, respectively, amount to 0.3 m, then the highest possible offset or phase shift of the reversing locations UB1–UB3 of the bundle leads BD relative to the reversing locations UH1–UH3 of the main bundles HB1–HB5 is 0.15 m. Thus, a sleeve length in the order of 0.4 through 0.5 suffices in order to enclose the distribution of the reversing locations UH1 and UH2 as well as UB1 shown in FIG. 4. It is to be noted that when branching a bundle, forexample, a sub-bundle BD1 of FIG. 4, from the main bundle HB1,a cut can be made at the right hand end of the path X so that a reserve bundle length is formed by undoing the stranding union for the sub-bundle BD1, so that it has a length greater than X, i.e. for about 0.2 through 0.25 m. The individual waveguide leads LW1–LW4 are conducted to a splicing part ST and are connected to the leads of a branching cable BDl* in the usual manner.

A branching diagram for a drawn in or laid optical cable OK of FIGS. 1 and 2 is illustrated in FIG. 5. It is assumed that the individual main bundles HB1–HB5 are respectively provided with a jacket MK or with at least a retaining helix WK in accordance with FIG. 1. At a first branching location VZ1, the main bundle HB1 is released from the union with the other bundles. This can occur during the draw-in operation by the jacket MK and/or the retaining helix WK being severed so that the main bundle HB1 is released from the overall union. As a consequence of the gluing of the retaining helix to the remaining bundles HB2–HB5 as well as to the central core CK under given conditions, the remaining union will continue to exist as a closed union, for example, and can be drawn in or laid further towards the right as illustrated. By contrast, the main bundle HB1, which was separated from the union, is branched off or separately laid in another direction, for example, a cable shaft or the like. A splice in the branch sleeve SAM in accordance with FIG. 4 is placed at a corresponding further branch location VZ2 whereby a cut off remainder of the sub-bundle BD1 is still present at the right hand exit thereof in addition to the sub-bundles BD2–BD5. This remainder of the bundle BDl no longer is required for further use but likewise does not become a disturbing factor. As already set forth in FIG. 4, the sub-bundle BD1 is cut open in the region of the branching sleeve SAM and the optical leads or fibers are conducted to a splice part ST where the four individual fibers LW1–LW4 are connected to the leads of a connecting cable BDl* which continues to forward the information incoming via the original bundle of the leads of the sub-bundle BD1.

If the main bundles HB1–HB5 and/or the respective sub-bundle, for example, BD1–BD5 are not provided with individual jackets, then a branching without a separate splicing sleeve could not be carried out in the region of the branching location VZ1 but the entire cable would have to be severed at VZ1 and all the light waveguide fibers would have to be spliced. I accordance with the examples of FIGS. 1 and 2, this would be approximately 100 splices. The solution with individually cladded main bundles HB1–HB5 and individually cladded sub-bundles is, therefore, particularly expedient. In contrast thereto either the jacket MB1 or at least the respective bundle cladding of the sub-bundles, for example, the sheath SH1 is still present to the right of the splice and the branch sleeve SAM for the bundles BD1–BD5 departing therefrom so that the protection is adequate. The inventive type of double SZ-stranding and of the corresponding selection of the position of the reversing locations guarantees that the branching for the additional optical cable BD1 can be effected within the sleeve SAM for which purpose, however, only four splices have to be placed in the region of the splice location ST. The damage to or, respectively, parting of the cable jacket MB1 is limited to the length L and to the region of the splice o cable sleeve SAM because due to the special SZ-stranding and the allocation of the reversing locations, an adequate reserve length for the splicing operations is provided in the region of the splice location ST and can be offered for the splicing element. At least roughly one half of the sleeve length L is thereby available for the reserve length whereby at least one reversing location is always offered and thus, offers particularly favorable handling possibilities.

The optical cable of the invention is thus, distinguished by easy drawing capabilities or properties, easy branchability (with a reduced number of splicing locations) and by good properties for splicing. With the branching of the main bundles HB1–HB5, the provision of splice sleeves are not required because each of the main bundles can be simply withdrawn by opening the retaining helix preferably applied in a crossed fashion and the individual sub-cable can, in turn, be drawn in or buried. As in previous cable structures, a pre-tailoring, for example, prepared splice locations at the end of the cable, is also possible given the arrangement of the invention.

A formatting example of an optical cable OK for 100 fibers comprises five main bundles shall be specified below without a common jacket MK:

Five main bundles, such as HB1–HB5, are each composed of a central element CB having a diameter 1.5 mm, and five sub-bundles BD1–BD5, each containing four fibers and having an outside diameter of 2.0 mm. These five sub-bundles and core element are stranded together and with the retaining helix WB and a filling compound FCA, form a cable core BS having a diameter of about 5.8 mm. By applying the cable jacket MB1 having a wall thickness of 0.5 mm on the cable core BS, an outside diameter of 7 mm will occur for the main bundle structure of FIG. 2.

Five of the main bundles HB1–HB5 are stranded onto a central core CK having a diameter of 5.0 mm and composed of unstranded glass rovings coated with hot-melt adhesive to form a cable core KS which is provided with a cross retaining helix WK as well as with the outside glide coating. The outside diameter of the optical cable OK then amounts to 19 mm and a jacket MK is not required. Overall at least one tight cladding, for example, a sheath SH1 for the sub-bundle BD1 or jacket MB1 for the main bundle HB1 must be provided. When both the basic bundles, for example, HB1 as well as the sub-bundles BD1 are cladded, a particularly well protected structure will occur and this cable will also have adequate flexibility. When the main bundles HB1–HB5 are cladded with a jacket, such as MB1, a common outside jacket MK is generally superfluous because the necessary cohesion is then assured to an adequate degree by the retaining windings.

Although various minor modifications may be suggested by those versed in the art, it should be understood that we wish to employ within the scope of the patent granted hereon, all such modifications as reasonably and properly come within the scope of our contribution to the art.

We claim:

1. In an optical cable having a plurality of main bundles with each of the main bundles being constructed of a plurality of sub-bundles having at least one optical waveguide, the improvements comprising the main bundles being stranded with a changing direction of lay at reversing points to form a cable core, the sub-bundles being stranded with changing direction of lay at reversing locations, the spacing between the reversing locations for the sub-bundles and the spacing between the reversing points for the main bundles being approximately the same and the spacing between the reversing points of the main bundles in comparison to the reversing locations of the sub-bundles being selected to be smaller than or equal a usual length of a cable sleeve so that when placing a cable sleeve on the optical cable, at least one reversing location and one reversing point will be positioned within the sleeve.

2. In an optical cable according to claim 1, wherein the spacing between the reversing locations for the sub-bundles and the reversing points for the main bundles is selected to be in a range of 0.2 and 0.5 m.

3. In an optical cable according to claim 1, wherein the main bundles are stranded onto a center element.

4. In an optical cable according to claim 3, wherein the sub-bundles of each of the main bundles are stranded onto a central element.

5. In an optical cable according to claim 1, wherein the sub-bundles of each of the main bundles are stranded onto a central element.

6. In an optical cable according to claim 1, wherein each of the main bundles are provided with a jacket.

7. In an optical cable according to claim 6, wherein each of the jackets of the main bundles have a wall thickness lying in a range of 0.3 to 1 mm and are composed of an abrasion-proof low-friction material.

8. In an optical cable according to claim 6, wherein each of the main bundles are provided with a tear-out thread.

9. In an optical cable according to claim 6, wherein the main bundles are stranded onto a central core which is provided with a hot-melt adhesive layer for holding the main bundles onto said core.

10. In an optical cable according to claim 1, wherein the cable core formed by the stranded main bundles includes at least one retaining helix for holding the stranded bundles together.

11. In an optical cable according to claim 10, which includes a second helix applied in a counter lay to the first mentioned helix.

12. In an optical cable according to claim 10, wherein the retaining helix forms an outside cladding for the optical cable.

13. In an optical cable according to claim 10, wherein the retaining helix is attached to the main bundles by an adhesive.

14. In an optical cable according to claim 1, wherein the stranding of the main bundles has a range of 1 to 3 lays per stranding direction.

15. In an optical cable according to claim 14, wherein the stranding of the sub-bundles has a range of 3 to 8 stranding lays per stranding direction.

16. In an optical cable according to claim 1, wherein the sub-bundles have a 3 to 8 stranding lays per stranding direction.

17. In an optical cable according to claim 1, wherein each of the sub-bundles has a protection sheath receiving at least one light waveguide.

18. In an optical cable according to claim 1, wherein the stranded main bundles are surrounded by a common outside jacket.

19. In an optical cable according to claim 1, wherein at least one of the main bundles is branchable from the optical cable.

20. In an optical cable according to claim 1, which includes a branching sleeve being arranged in a region of reversing location of the sub-bundles.

21. In an optical cable according to claim 20, wherein each of the main bundles has a jacket, and wherein each of the jackets of the main bundles are marked for the reversing locations of the sub-bundles thereof.

22. In an optical cable according to claim 1, wherein each of the main bundles is provided with markings to identify the position of the reversing locations for the sub-bundles of the main bundle.

* * * * *